(12) United States Patent
ElMankabady et al.

(10) Patent No.: US 8,155,767 B2
(45) Date of Patent: Apr. 10, 2012

(54) REMOTE BUILDING CONTROL DATA DISPLAY WITH AUTOMATIC UPDATES

(75) Inventors: Emad ElMankabady, Monroe, NJ (US); Karen Lontka, Randolph, NJ (US)

(73) Assignee: Siemens Industry, Inc., Alpharetta, GA (US)

( * ) Notice: Subject to any disclaimer, the term of this patent is extended or adjusted under 35 U.S.C. 154(b) by 1385 days.

(21) Appl. No.: 11/713,573

(22) Filed: Mar. 2, 2007

(65) Prior Publication Data

US 2007/0208438 A1    Sep. 6, 2007

Related U.S. Application Data

(60) Provisional application No. 60/779,259, filed on Mar. 3, 2006.

(51) Int. Cl.
    *G06F 19/00* (2006.01)
(52) U.S. Cl. ............................. 700/83; 703/13
(58) Field of Classification Search .................. 700/83, 700/275, 276, 19, 277, 286, 20; 703/13, 703/20, 2; 715/47; 709/224, 200, 104.1; 345/329, 357, 970
    See application file for complete search history.

(56) References Cited

U.S. PATENT DOCUMENTS

| | | | | |
|---|---|---|---|---|
| 5,639,211 A * | 6/1997 | Bintz | ........................ | 415/173.7 |
| 5,950,109 A * | 9/1999 | Choi | ............................ | 438/761 |
| 6,157,943 A * | 12/2000 | Meyer | ........................... | 709/203 |
| 6,192,282 B1 * | 2/2001 | Smith et al. | ..................... | 700/19 |
| 6,198,479 B1 * | 3/2001 | Humpleman et al. | ........ | 715/733 |
| 6,487,457 B1 * | 11/2002 | Hull et al. | ........................ | 700/17 |
| 6,598,056 B1 * | 7/2003 | Hull et al. | ............................. | 1/1 |
| 7,009,510 B1 * | 3/2006 | Douglass et al. | ............. | 340/531 |
| 7,095,321 B2 * | 8/2006 | Primm et al. | ................. | 340/540 |
| 7,110,843 B2 * | 9/2006 | Pagnano et al. | ............... | 700/108 |
| 2005/0021188 A1 * | 1/2005 | Imhof | ........................... | 700/276 |
| 2007/0278320 A1 * | 12/2007 | Lunacek et al. | ................ | 236/94 |
| 2008/0262816 A1 * | 10/2008 | Lontka | ............................ | 703/13 |
| 2009/0055765 A1 * | 2/2009 | Donaldson et al. | ........... | 715/771 |
| 2009/0228812 A1 * | 9/2009 | Keenan et al. | ................ | 715/762 |
| 2009/0246840 A1 * | 10/2009 | Taran et al. | .................... | 435/134 |

OTHER PUBLICATIONS

Steven T. Bushby, Fire Alarm System with Building Automation and Control Systems, Summer 2001, Fire Protection Engineering, p. 5-11.*

Paul et al., Internet-Based Monitoring and controls for HVAC Applications, Jan./Feb. 2002, IEEE Industry Applications Magazine, p. 49-54.*

* cited by examiner

*Primary Examiner* — Kidest Bahta

(57) ABSTRACT

A method includes receiving at a first computer at least one interpreted program over the Internet using a web-browser. The method further includes executing at the first computer at least one interpreted software program to display at least a first graphical element, each graphical element having characteristics dependent upon a status of a corresponding building control system device in a remote location. The method also includes transmitting to the first computer first information regarding a change in status of at least one building control system device, and then transmitting to the first computer second information regarding a subsequent change in status of at least one building control system device. The transmission of second information is provided in the absence of a request transmitted by the first computer for updated information.

23 Claims, 7 Drawing Sheets

REMOTE BUILDING CONTROL DATA DISPLAY WITH AUTOMATIC UPDATES

This application claims the benefit of U.S. Provisional Patent Application Ser. No. 60/779,259, filed Mar. 3, 2006, and which is incorporated herein by reference.

FIELD OF THE INVENTION

The present invention relates generally to building systems, and more particularly, to remote monitoring of building control systems.

BACKGROUND OF THE INVENTION

Building control systems encompass a wide variety of systems that aid in the monitoring and control of various aspects of building operation. Building control systems include security systems, fire safety systems, lighting systems, and heating, ventilation, and air conditioning ("HVAC") systems. In large commercial and industrial facilities, such systems have an extensive number of elements and are highly automated.

The elements of a building control system are widely dispersed throughout a facility. For example, an HVAC system includes temperature sensors and ventilation damper controls, as well as other elements, which are located in virtually every area of a facility. Similarly, a security system may have intrusion detection, motion sensors and alarm actuators dispersed throughout an entire building or campus. Likewise, fire safety systems include smoke alarms, pull stations and notification devices dispersed throughout the facility. To achieve efficient and effective building control system operation, there is a need to monitor the operation of, and often communicate with, the various dispersed elements of a building control system.

One of the more important aspects of a building control system that requires monitoring is alarm status. Most or all building control systems employ alarms to indicate non-standard operation, including indications of equipment malfunctions and/or unsafe conditions. Fire safety systems, for example, issue alarms when smoke, or extreme heat is detected, or when a manual fire alarm pull handle device ("pull station") has been activated.

To monitor alarm status, and/or other building conditions, building control systems typically have one or more centralized control stations in which alarm status and other data from the system may be monitored. Such centralized control stations also allow control over various aspects of system operation. The control station typically includes a computer having a processing circuit, data storage, and a user interface. To allow for monitoring and control of the dispersed control system elements, building control systems often employ multi-level communication networks to communicate operational and/or alarm information between operating elements, such as sensors and actuators, and the centralized control station.

In the past, control stations provided building control data exclusively in text format, which typically required intimate system knowledge to interpret and understand. As building control systems become more complex, it has become increasingly advantageous to present building system data in a more intuitive manner. Thus, control stations of building control systems now generally employ graphical user interfaces that combine text information with representative graphics to illustrate the context of the system data being displayed.

An example of the use of representative graphics may be the use of a thermometer shaped graphic to represent a temperature reading, as opposed to a simple one line text value. Similarly, the alarm status for a floor of building may be represented on a graphical display of the building floor plan, as opposed to a simple text list of alarm locations.

One example of a building control system control station that employs a graphical user interface in the control station is the NCC Workstation, available from Siemens Building Technologies, Inc. of Buffalo Grove, Ill., which may be used with the model MXL or XLS fire safety systems, also available from Siemens Building Technologies, Inc. In this system, several control stations, connected via an Ethernet or another type of network, may be distributed throughout one or more building locations, each having the ability to monitor and control system operation. As a consequence, different people in different locations of the facility may monitor and control building operations.

While the use of multiple networked control stations provides a high level of convenience and efficiency, there has been a growing need to be able to monitor and/or control systems from offsite locations.

To address this need, the use of Internet access to a building control system has been proposed, as discussed in U.S. Pat. No. 6,157,943 to Meyer (hereinafter the "943 patent"). The '943 patent describes a relatively straightforward system that incorporates ASP technology available from Microsoft Corporation of Redmond, Wash. to generate web pages that incorporate building control system information. The system described in the '943 patent builds graphical web pages that include building system data, and then transmits the graphical web pages to a web client. The '943 patent appears to describe the intended use of the ASP technology.

There are, however, significant limitations to the type of system described in the '943 patent. In particular, when building control system information is transmitted in a graphical image context, it requires significant bandwidth and download time. As a consequence, receiving updates over the Internet can be time consuming and inefficient as compared to receiving updates on a control computer that is connected directly to the building system network. While ongoing data communication developments improve Internet download speeds, it nevertheless can take significant time to download pages full of graphics. Moreover, if several clients access the same web server, the large, graphics-intensive downloads may slow the response time of the server, thereby also increasing the delay in receiving graphical build system user interface screens.

There is a need, therefore, for a method of providing faster and more frequent updates in a remote building system monitoring device using the Internet. Preferably, such a system would retain the ability present data in graphical format.

SUMMARY

The present invention addresses at least some of the above stated needs, as well as others, by providing a remote display update device that employs refresh technology that does not require re-polling by the user. In other words, the device employs a technique that enables server to send data to client without the client having to request it. The technique is based on an event-driven web application that is hosted in the web browser. In one embodiment, a remote alarm graphic system uses web movie technology to provide a remote representation of an alarm graphics display that is easily updated.

A first embodiment of the invention is a method that includes receiving at a first computer at least one interpreted program over the Internet using a web-browser. In a particular non-limiting example, the interpreted program is a web movie. The method further includes executing at the first computer at least one interpreted software program to display at least a first graphical element, each graphical element having characteristics dependent upon a status of a corresponding building control system device in a remote location. The method also includes transmitting to the first computer first information regarding a change in status of at least one building control system device, and, at a subsequent time, transmitting to the first computer second information regarding a subsequent change in status of at least one building control system device. The transmission of the change in status is provided in the absence of a request transmitted by the first computer for updated information.

A second embodiment of the invention is an arrangement that includes a communication circuit, a user interface device and a processing circuit. The communication circuit is configured to receive at a first computer at least one interpreted program over the Internet. The user interface device is operable to provide information in human perceptible format. The processing circuit has a web-browser, and is configured to execute the at least one interpreted program to display at least a first graphical element, each graphical element having characteristics dependent upon a status of a corresponding building control system device in a remote location. The processing circuit is further configured to receive first information via the communication circuit regarding a change in status of at least one building control system device, and to receive second information via the communication circuit regarding a subsequent change in status of at least one building control system device. The second information is received in the absence of a request transmitted by the computing arrangement for updated information.

The above described features and advantages, as well as others, will become more readily apparent to those of ordinary skill in the art by reference to the following detailed description and accompanying drawings.

DETAILED DESCRIPTION

Figure 1:
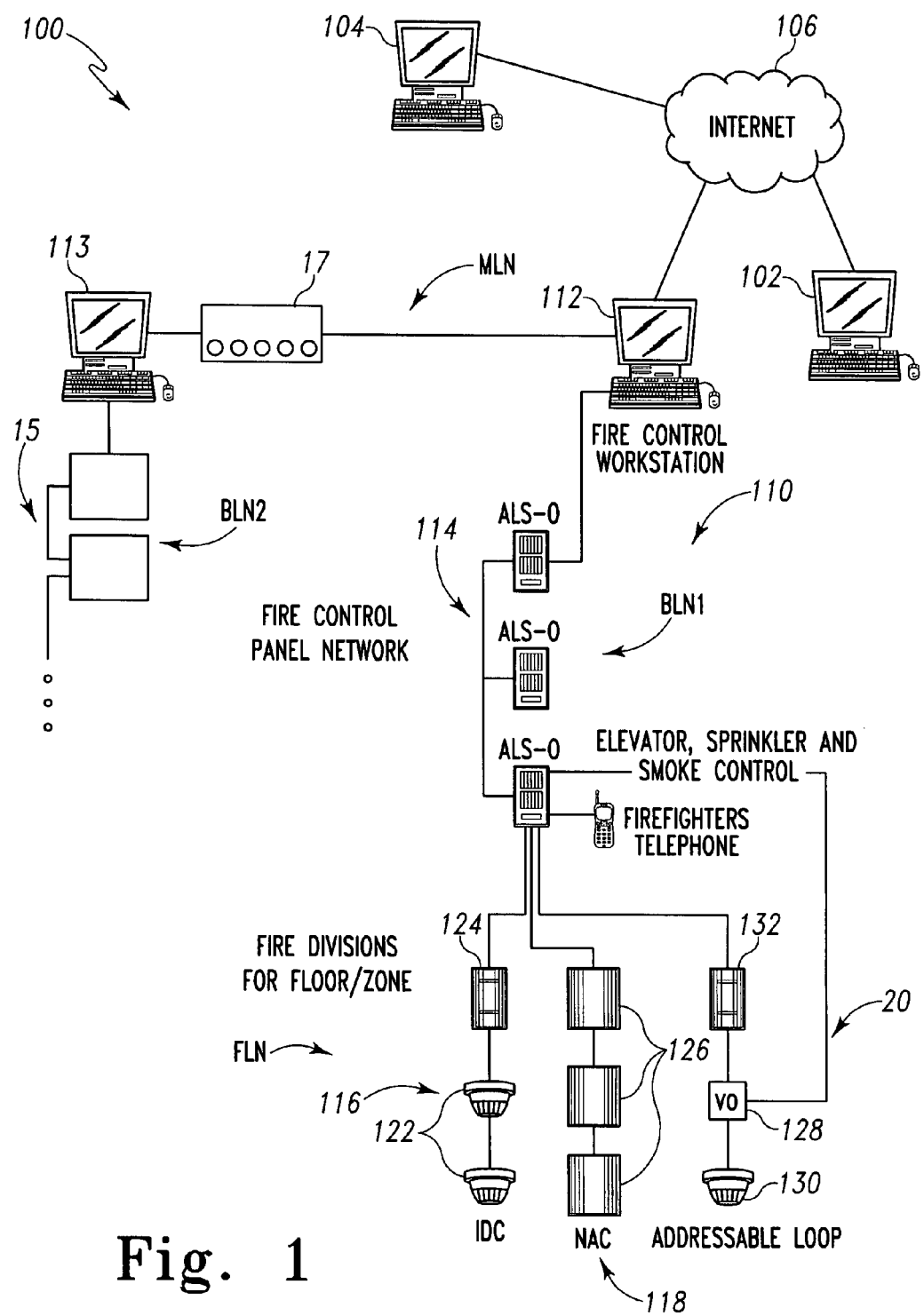
FIG. 1 shows an exemplary embodiment of a fire safety system in which an embodiment of the invention is implemented.

FIG. 1 shows an exemplary embodiment of a fire safety system 100 in which an embodiment of the invention is implemented. The fire safety system 100 includes a communication network 110 which interconnects fire system devices. The fire system devices of the system 100 include control workstations 112 and 113, fire control panels 114 and 115, and other fire system devices 122, 124, 126, 128, 130 and 132. The other fire system devices include pull stations 124, 132, smoke and/or heat detectors 122, 130, notification appliances 126.

The network 110 in the embodiment described herein actually involves several layers of interconnected subnetworks, including a management level network MLN, one or more building level network BLN1, BLN2, and one or more floor level networks associated with each building level network. For example, floor level networks 116, 118 and 120 are associated with the BLN1 of FIG. 1.

The MLN, which may suitably comprise an Ethernet standard network employing TCP/IP protocol, includes a plurality of workstations, represented herein as workstations 112 and 113, connected via a hub 117. The work stations 112 and 113 provide a graphical and/or text-based user interface for the fire safety system 100. Each of the workstations 112, 113 is also connected to a set of fire safety sensors and/or actuators (e.g. devices 122, 124, 126, 128, 130 and 132) via a lower level BLN. The work stations 112, 113 employ the MLN to share data received from such actuators and sensors. It will be appreciated that the work stations 112, 113 may be coupled to XLS and MXL brand fire safety system devices available from Siemens Building Technologies, Inc.

At least one workstation, shown in FIG. 1 as the workstation 112, is further operably connected to provide graphic data regarding the status of at least some of the fire safety devices in the fire safety system 100 to a plurality of remote user computers 102, 104 via the Internet 106. To this end, the workstation 112 includes a processing circuit, not shown in FIG. 1 (see FIG. 3), that is operable to provide to a user computer, e.g. the computer 102 and/or 104, at least one program over the Internet that may be interpreted using a web-browser program. In one embodiment, the interpreted program includes web movie formatted content, or in the alternative, another format that at least enables updates without repeated polling by the user computer 102 and/or 104. When displayed, the program causes the remote user computer 102, 104 to display at least a first graphical element. The first graphical element has a visual (or audible) characteristic that is dependent upon a status of a corresponding fire safety system device (or of a condition detected or caused by a device) in a remote location. For example, the first graphical element could be a screen icon that is representative of a smoke detector, such as the smoke detector 130 of FIG. 1.

The workstation 112 is further operable to transmit to the user computer 102, 104 information regarding a change in status of at least one building control system device (or condition). This information is also displayed by the user computer 102, 104. Further details regarding exemplary arrangements for providing remote graphical updates of fire system device status are provided below in connection with FIG. 2.

In further detail regarding the fire safety devices, the workstation 112 is connected to a first building level network BLN1 that facilitates communication with and among a number of fire control panels 114 that monitor and control various fire devices and functions. The fire control panels 114 are specialized hardware devices that connect to networks of fire detection and notification devices, as well as providing other fire control functions. These fire control panels 114 are UL listed for fire protective signaling use. One such fire control panel is the ALS-3 panel produced and sold by Siemens Building Technologies, Inc. In general, the ALS-3 fire control panel includes a central processor, battery back-up, a network interface card, connections for a number of fire device networks, connections for a firefighter's phone system, dry contacts for additional functions, and a user interface including status indicators. The network interface card for each of the fire control panels 114 allows communication among all of the panels 114 and with the fire control workstation 112. Other suitable fire control panels include those associated with various fire safety systems such as MXL, XLS, XL3, etc. available from Siemens Building Technologies, Inc.

The workstation 112 can be regarded as residing at a management level of the fire safety system 100. The fire control panels 114 form part of the BLN1. As shown in FIG. 1, at least one of the of the fire control panels 114 is further connected to a plurality of floor level or device networks 116, 118 and 120 that include the fire control devices themselves. Each type of device is preferably connected to a common fire control panel that monitors the associated device network for trouble, receives signals from and sends signals to the device network, and usually provides power to the devices on the network. The associated fire control panel 114 also includes means to test the integrity of the device network 116, 118, 120, as well as connected fire control devices. The associated fire control panel 114 is configured to produce a trouble signal in the event of a malfunction or anomaly. The trouble signal is communicated to the management level fire control workstation 112. Such operations are well-known in the art.

The workstation 113 is similarly connected to a building level network BLN2. The building level network BLN2 is connected another set of fire control panels 115. The fire control panels 115 are typically each connected to floor level networks and fire safety system devices, not shown, but which are similar to networks 116, 118, 120 and the associated devices.

Referring again generally to the network BLN 1, the device networks 116, 118 and 120 are designed to accommodate different fire control devices. For instance, network 16 includes Initiating Device Circuits (IDCs), which can include smoke detectors 122 and pull station 124. IDCs such as the detectors 122 and pull stations 124 initiate an actual fire alarm. By contrast, the device network 118 includes Notification Appliance Circuits (NACs) 126. NACs 126 are similar to IDCs but include notification devices, such as audible alarm horns, visible strobes or audio speakers. The fire control panels 114 associated with each of these networks continuously monitors the integrity of these networks 116, 118 by passing a low level current through the circuits of the IDCs 122, 124 and the NACs 126. Any disruption in this continuous current (that is not associated with an alarm condition) is identified by the fire control panel as an error condition giving rise to an alarm signal representative of trouble (i.e. fire, smoke or other dangerous physical condition, or equipment or communication errors).

The device network 120 may suitably be an addressable loop 128, which is a network of addressed fire safety system devices. The addressable loop 128 allows the corresponding fire control panel 114 to selectively receive and transmit signals from individual detection devices on the loop. As shown in the example of FIG. 1, the addressable loop 128 includes an IDC smoke detector 130 and a pull station 132. Unlike the device networks 116 and 118, the addressable loop 128 of the network 120 does not use a continuous signal to monitor its integrity. Since all of the devices on the loop 128 are assigned an address, the fire control panel 114 can routinely communicate with these devices to see if they are still available. A failure to communicate with a particular addressed device causes the control panel 114 to generate an alarm signal that is supplied to the management level workstation 112.

It will be appreciated that the fire safety system 100 includes several other pull stations and smoke detectors, not shown, connected to fire control panels 114 on the existing floor level networks 116, 118 and 120 as well as other floor level networks, not shown. The illustrated devices are provided by way of example for clarity of exposition.

The general operation of fire safety system elements such as elements 122, 124, 126, 128, 130 and 132 are known in the art. The smoke detectors 122 generate a trouble signal, i.e. an alarm, if smoke is detected. The alarm signal travels via the network 116 to the fire control panel 114, which, in turn, generates an alarm message and transmits the alarm message for the control station 112 via the network BLN1. A fire control panel 114 then causes one or more of the notification devices 126 to provide an audible or visible notification of the detected trouble condition. The fire control panel 114 causes such notification either as a function of localized control, or under the control of the control station 112.

Similarly, the pull station 124 generates a trouble signal when it is actuated by a human operator. As with the smoke detector alarm signals, the pull station alarm signal travels via the network 116 to the fire control panel 114, which, in turn, provides an alarm message to the control station 112 via the network BLN1. A fire control panel 114 then causes one or more of the notification devices 126, 132 to provide an audible or visible notification of the detected trouble condition. The fire control panel 114 causes the notification either as a function of localized control, or under the control of the control station 112.

As discussed above, an alarm signal may also be generated if there is an equipment operation issues, such as failure or malfunction of one of the networks 116, 118, 120, or one of the fire safety system devices. When a trouble condition or error condition is detected, the fire safety system 100 (either the fire control panel 114 or the control station 112) generates a data message, data set or data object having a corresponding set of alarm information. The data structure or object identifies the source of the alarm (either a device or the corresponding fire control panel), the type of alarm (e.g. trouble, malfunction), the date/time stamp of the alarm, an acknowledgement status, and other information. Alarm data objects may suitably include more or less information as is known in the art.

Acknowledgement status for alarms, as is known in the art, provides information regarding the handling of an alarm condition. Acknowledgement status provides information as to whether a particular alarm condition has been acknowledged. In general, fire safety systems such as the fire safety system 100 require that alarm conditions be acknowledged by a human operator. An acknowledgement ensures that an authorized human operator has been made aware of the alarm condition. As a consequence, when an alarm signal is generated, an alarm data object initial indicates that the alarm has not been acknowledged. A human operator may acknowledge the alarm typically by following an acknowledgement process in the control computer 112 (or 113), or even in the remote computers 102 or 104. Once the alarm condition is acknowledged, the corresponding acknowledgement status indicator is changed such that it reflects that the alarm has been acknowledged. In some systems, separate data objects or messages are created when an alarm signal is generated and when that alarm signal is acknowledged.

It is a reality that a building may have several active alarm conditions at any one time. It is therefore important that alarm information be presented to human operators in a cohesive and intuitive manner to facilitate management of alarm situations. Accordingly, prior art fire safety systems provide user interface screens with graphic displays containing information on active alarms. Such screens often provide text information and graphic information in the form of flashing icons or symbols, particularly for alarm conditions that have not yet been acknowledged.

In accordance with at least one embodiment of the present invention, a graphical display that includes alarm status is provided to at least one of the remote computers 102, 104. The graphical display may suitably have the appearance of the display of FIG. 6, described further below. However, the exact nature of the display may vary according to the needs and preferences of the system and system designers. The ability to provide a remote display allows for off-site monitoring of fire/safety alarm conditions within a facility in quasi-real time. Such off-site monitoring can increase security and responsiveness with regard to fire safety systems.

Figure 2:
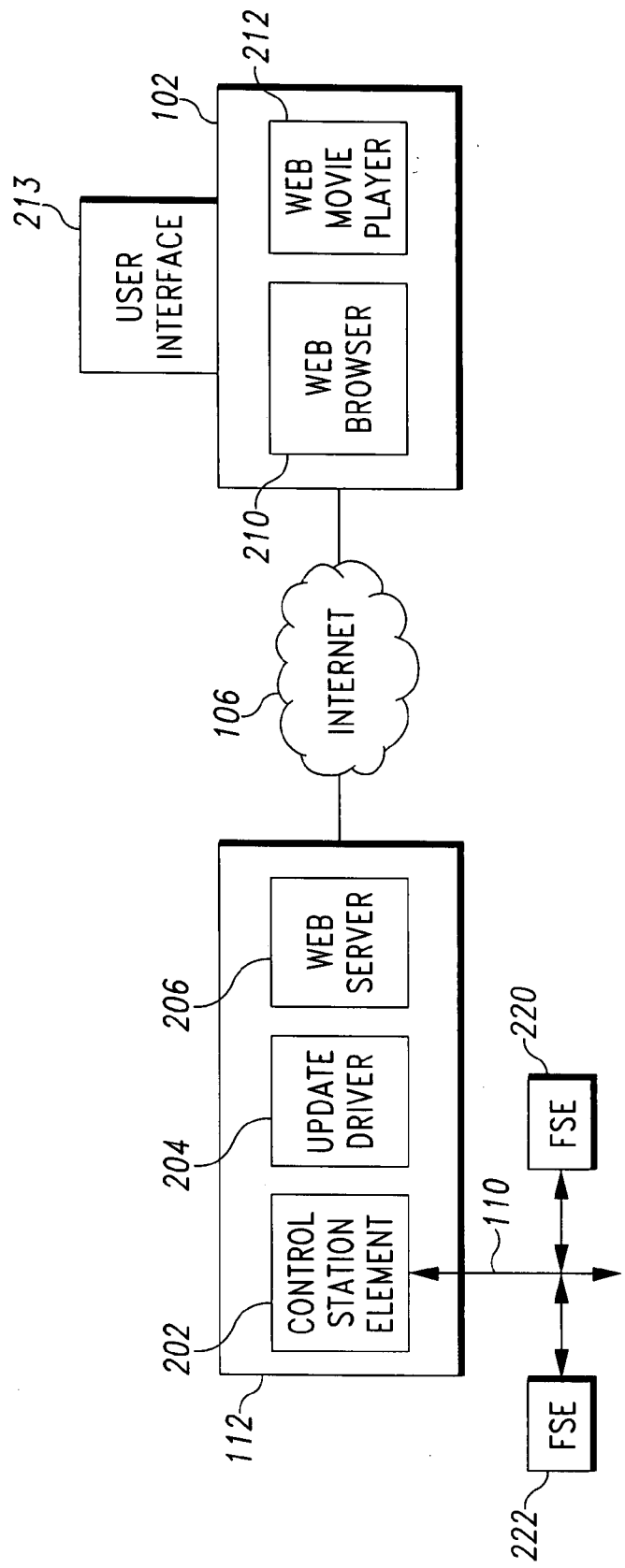
FIG. 2 shows an exemplary arrangement for providing remote building control system information according to the invention.

FIG. 2 shows in further detail how the various elements of FIG. 1 may be configured to generate the remote updated graphic alarm display described above. To this end, FIG. 2 shows an exemplary arrangement according an embodiment of the invention that may be used in the system 100 of FIG. 1. The arrangement 200 includes the control station 112 which in this embodiment of the invention includes a control station element 202, an update driver 204 and a web server 206. The arrangement 200 also includes at least one remote user station 102 that includes a web browser 210, a web movie player 212 and a user interface 213.

The control station element 202 is connected to fire safety elements 220, 222, as well as others shown in FIG. 1 via the building communication network 110, discussed above in connection with FIG. 1. In the exemplary embodiment described herein, the fire safety elements 220 and 222 are fire control panels such as the fire control panels 114 of FIG. 1. The fire safety elements 220 and 222 are considered "nodes" of the system 100. The control station element 202 may suitably include the normal elements of a commercially available building control workstation such as the NCC™ brand fire safety system workstation, available from Siemens Building Technologies, Inc. of Buffalo Grove, Ill. In alternative embodiments involving other building control systems, such as HVAC systems or security systems, the INSIGHT™ brand building automation system workstation may be employed, which is also available from Siemens Building Technologies, Inc. of Buffalo Grove, Ill.

In accordance with this embodiment of the present invention, however, the hardware and software of the commercially available control stations described above may be further configured to include the update driver 204 and the web server 206. Those of ordinary skill in the art may readily modify an existing control workstation of a building control element to include a suitable update driver and web server to carry out the operations described below.

The update driver 204 is a software program or set of programs configured to obtain information regarding the fire safety system 100 from the control station element 202 and formulate corresponding data structures that may be used by client-based software to generate a remote interactive building element alarm status display, as will be discussed below.

The web server 206 is a program that is operably connected to the remote user computer 102 and other similar user computers, for example, the user computer 102 via the Internet 106. The web server 206 is operable to generate web pages with an embedded web movie which provide data such as that generated by the update server 204, over the Internet 106 to remote users. Such remote users include, by way of example, the remote computer 102, which includes at least a standard web-browser 210. To this end, the web server 206 may suitably be the commercially available Apache web server available from The Apache Software Foundation of Forest Hill, Md.

Figure 3:
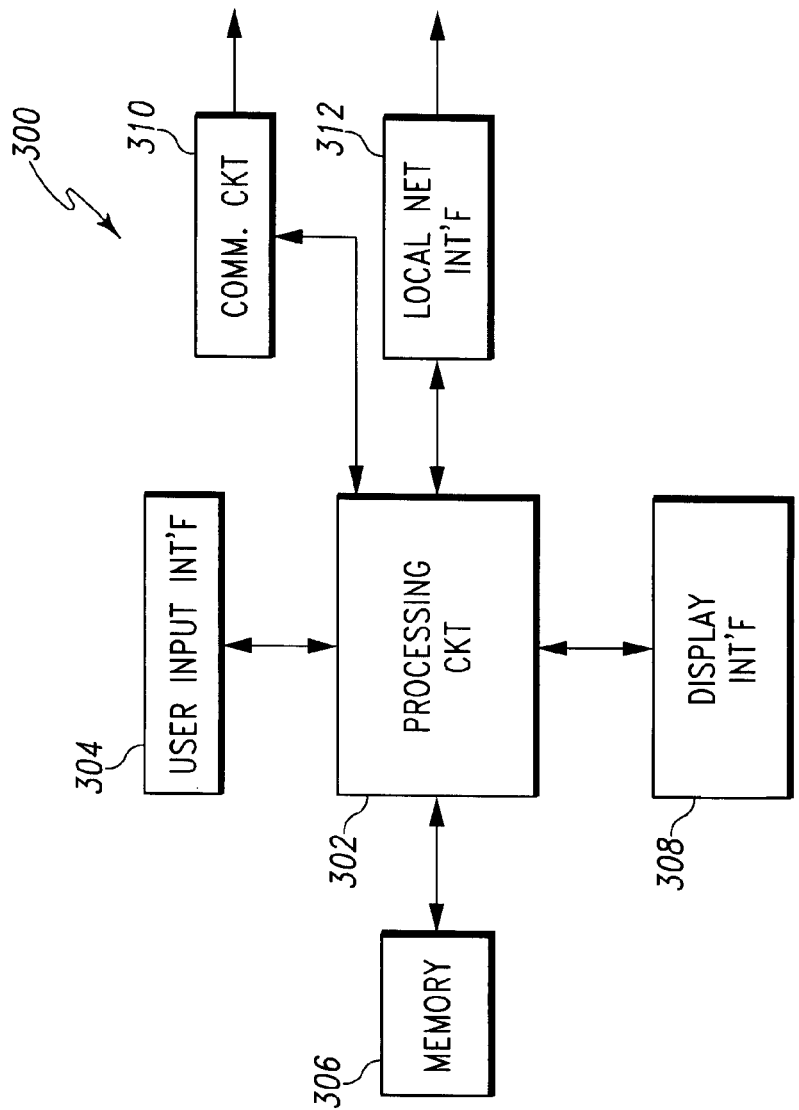
FIG. 3 shows a schematic block diagram of an exemplary embodiment of a computing device that may be used as a control station of the arrangement of FIG. 2.

As discussed above, the operations of the web server 206 and update server 204 may readily be incorporated into existing hardware structures of commercially available building control workstations, which already house the control station element 202. Regardless of how specifically configured, FIG. 3 shows a schematic block diagram of an exemplary embodiment of a computing device that may be used as the hardware of control station 112 of FIGS. 1 and 2, as well as in other embodiments. FIG. 3 shows an exemplary computing device 300 that includes a processing circuit 302 connected to a user input interface 304, a memory 306, a display interface 308, a communication circuit 310 that is configured to be connected to the Internet, and a local network interface circuit 312 that is operable to be connected to a building level network of a fire safety system such as the network BLN1 of FIG. 1.

Referring again to the description of the computing device used as the workstation The computing device 300 may suitably be a general purpose personal computer, or a modified or specialized computing device. The processing circuit 302 may suitably be a general purpose or special purpose microprocessor or microcontroller and its accompanying circuitry. The user input interface 304 may suitably include a keyboard, pointing device, voice interface, or the like, for receiving user input. The display interface 308 preferably includes a visible and/or audible display. The communication circuit 310 may suitably be a telephone modem, cable modem, DSL modem, or other device that can connect to, or serve as, an Internet gateway. The network interface circuit 312 may suitably be a LAN card or other network driver circuit that facilitates connection to a communication network.

The memory 306 may suitably include a number of memory devices and/or circuits, such as random access memory, read-only memory, disk drives, CD-ROM drives and any other memory capable of storing either programming instructions, scratchpad data, and/or other data.

It will be appreciated that the user computers 102, 104 of FIG. 1 may suitably have the same general configuration, except that the interface circuit 312 is not necessary. Moreover, in the embodiment described herein, the user computers 102, 104 all include any suitable visible display device as the display interface 308. The visual display device may suitably be a cathode ray tube device, an LCD display device, a plasma screen device or other display suitable for displaying graphics and text.

In the embodiment described herein, whenever a computer or control station is mentioned herein as displaying something, it is a display interface such as the display interface 308 that displays the information, under the control of a processing circuit such as the processing circuit 302. When ever a computer or control station is mentioned herein as receiving user input, it is through a user interface such as the user input interface 304. Whenever a computer is said to communicate information via the Internet, it is through the performing a certain operation, it is a communication circuit such as the communication circuit 310 that facilitates such communication, often under the control of the processing circuit. Whenever the control station is said to communicate information to communication networks within the building, such as the building level network BLN1 of FIG. 1, it is a network interface circuit such as the network interface circuit 312 that performs such communication under the control of the processing circuit. All internal logical operations attributable to a control station or computer described herein are performed by the processing circuit. Thus, for example, the general operations of the control station element 202, the update driver 204, the web server 206, the web browser 210 and the web movie player 212 are all performed by the processing circuit.

Referring again generally to FIG. 2, the user computer 102 may suitably be a general purpose personal computer or other portable "laptop" computer. The user computer 102 includes a web browser 210, a web movie player 212 and a user interface 213. The web browser 210 may suitably comprise a commercially-available web browser such as Firefox, Netscape Navigator, or Internet Explorer. The web movie player 212 is a software object or suite that is operable to receive instructions in a commercially web-movie software environment (such as an .swf file or Macromedia Flash Movie), and execute the movie file to provide a rich Internet application. By way of example, the web movie player 212 may be Macromedia Flash Player. The web movie player 212 is preferably embedded in, or readily accessible by, the web browser 210.

The user interface 213 may be any common computer user interface that receives user input and generates displayable output. The user interface 213 may suitably have the structure of the user input interface 304 and display interface 308 of FIG. 3, discussed above.

Figure 6:
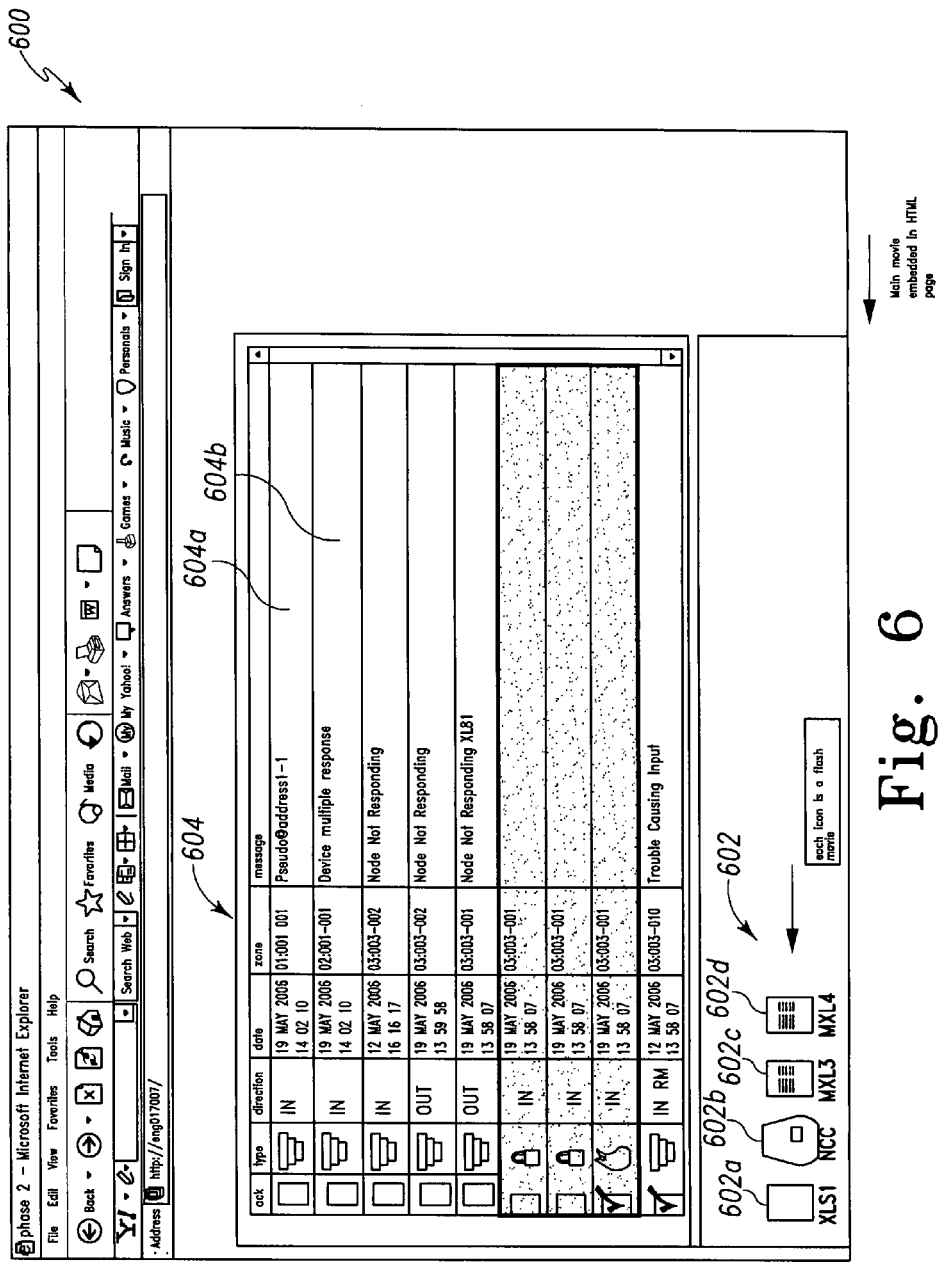
FIG. 6 shows an exemplary display screen that may be generated in accordance with an embodiment of invention.

The general operation of FIG. 2, the building system elements 220, 222 (as well as other elements, not shown) will from time to time generate alarm conditions for which alarm data objects are created. In general, the control station element 202 of the control station 212 maintains the alarm data objects, and displays them so that a human operator may monitor the alarm conditions. FIG. 6, discussed further below, shows an exemplary alarm status display 600 that includes system node graphics 602, and an alarm list 604. The alarm list 604 provides a display of much of the information for existing alarm events. The information is contained with the corresponding alarm data objects. It will be appreciated, however, that the alarm status display at the control station element 202 may take many forms.

In accordance with embodiments of the present invention, a user at one or more of the remote computers 102, 104 may generate a request to monitor alarms from their remote location. For the purposes of this example, it will be assumed that the request is generated by the remote computer 102. The request may suitably be an http request for the URL of the web server 206. The request is provided by the web browser 210 of the remote computer 102, propagates through the Internet 106, and is received by the web server 206 of the control station 112. The web server 206, alone or in cooperation with the update driver 204, transmits information that includes an interpreted software program and alarm system data.

The alarm system data is provided by, or through, the control station element 202. The interpreted software program is one that, when executed by common components of the web browser 210 and/or the associated web movie player 212, causes a display of system alarm information on the user interface 213 of the remote computer 102.

By way of example, the web server 206 transmits an HTML page with an embedded web movie, the web movie constituting the interpreted software program. As will be discussed below, the web movie contains the general flow and appearance of the display. In the embodiment described herein, the web movie player 212 of the remote computer 102 receives the interpreted program, and causes the display of current alarm status on the user interface 213.

As shown in the exemplary alarm status display 600 of FIG. 6, the display advantageously includes graphical elements 602 representative of system devices or nodes, and a list 604 of alarm events. The appearance of the node graphic elements 602 and/or the elements of the alarm event list 604 advantageously provides instant detail as to type, severity or acknowledgement status of alarms.

The web movie player 212 at the remote computer 102 thereafter receives data from the update driver 204 that provides actual up to date alarm system data. The web movie includes software that is capable of rendering graphic displays of the alarm system data. Thus, if at some point, status of one of the existing alarm conditions changes, the control station element 202 provides information regarding the change to the update driver 204. The update driver 204 transmits to the remote computer 102 information regarding the change in status of the alarm condition. The web movie player 212 at the remote computer 102 receives the information, and and executes a program (plays a movie "scene") that changes the display 600 to reflect the status change.

Status updates of existing alarm conditions naturally occur on an ongoing basis. In accordance with one aspect of the embodiment of the invention described herein, the control station 112 provides updates responsive to the ongoing changes in alarm conditions to the remote computer 102 without any polling or updated requests by the remote computer 102. To this end, it is known that Macromedia FLASH™ technology may be used to provide new information without requiring a refresh screen request or polling request from the remote computer 102. To this end, the interpreted software program (i.e. the FLASH™ movie) is configured to contain code that establishes a TCP/IP socket with the update driver 204. The update driver 204 may then transmit updates directly to the web movie that is played by the web movie player 212.

Figure 4:
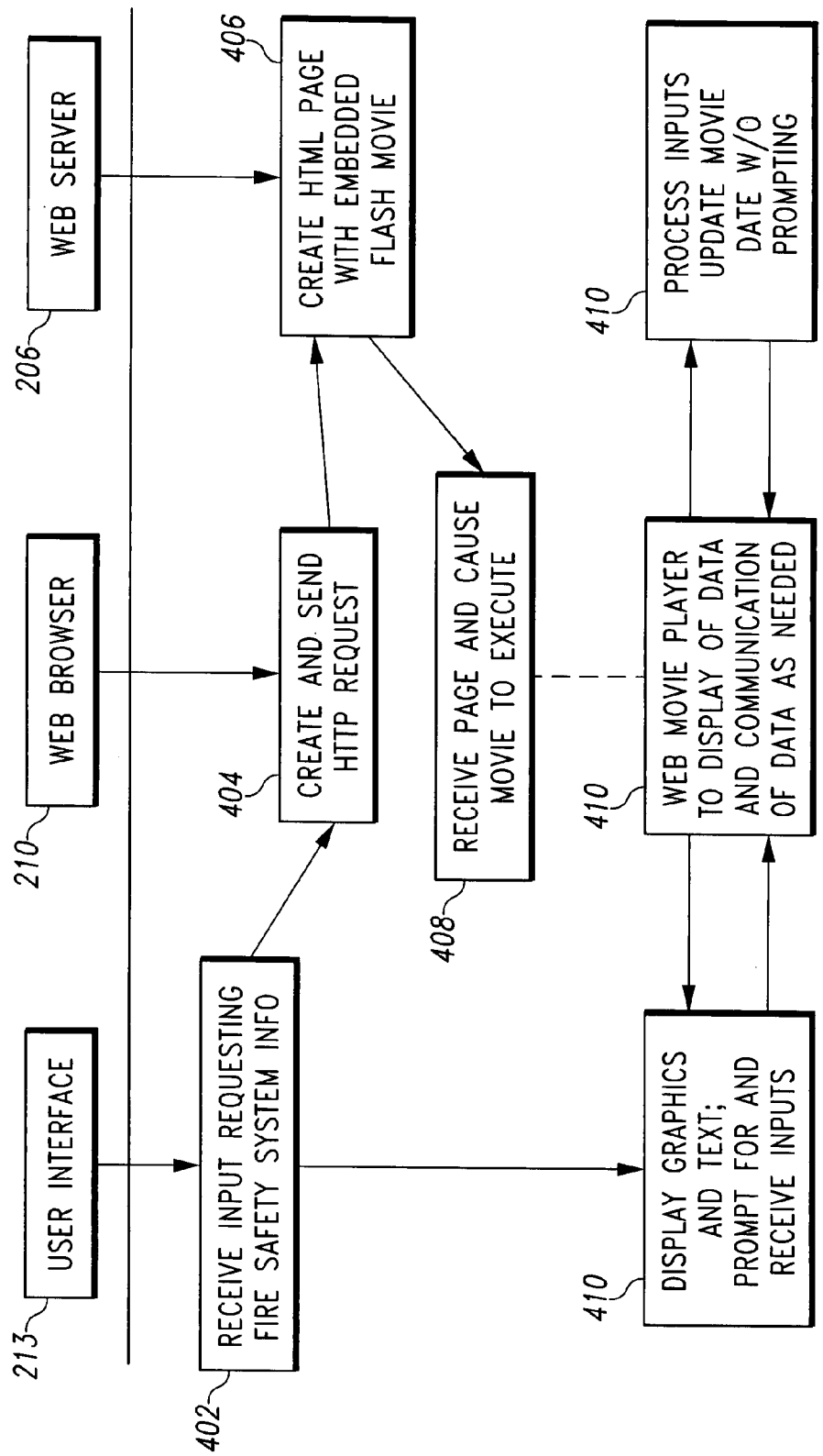
FIG. 4 shows an exemplary set of operations of the devices in FIG. 2 for providing remote building control system information in accordance with an embodiment of the invention.

FIG. 4, described further below, provides in further detail the operations of the embodiment of FIG. 2 in providing alarm status displays and updates in accordance with embodiments of the invention. The operations shown in FIG. 4 are described in terms of the web server 206 of the control station 112, the web browser 210 of the remote user computer 102, and the user interface 213 of the remote user computer 102. In this embodiment, all communications between the web server 206 and the web browser 210 are made over the Internet 106, not shown in FIG. 4.

The process is initiated, as described in above, when the user requests the alarm status display of a particular fire safety system. To this end, in step 402, the user interface 213 receives a URL (universal resource locator) identifying a fire safety system alarm status display site, which is associated with the web server 206. The user interface 213 provides the URL to the web browser 210.

In step 404, the web browser 210 formulates a hypertext transfer protocol (HTTP) request corresponding to the requested display and sends the HTTP request to the web server 206. The operations of step 404 are standard to almost all commercially available web-browsers.

In step 406, the web server 206 creates a responsive hypertext markup language (HTML) page that includes an embedded FLASH movie. The movie is configured to be executed by a Flash player (i.e. web movie player 212) installed in the web browser 210. The movie includes a main movie (e.g. procedure) as well as embedded movies within the main movie. The movie, when executed by a movie player 212 in the web browser 210, generates graphic displays of nodes of the requested fire safety system, a graphic and text-filled list of events of the requested fire safety system, performs authentication, allows changes to events list and node graphics via XML data updates received from the update driver 204. Further detail regarding these operations is provided below in connection with FIG. 5. Exemplary software code of salient portions of the web movie is provided in the software appendix to this application. In any event, the web server 206 provides the HTML page that includes the movie code to the web browser 210.

Thereafter, in step 408, the web browser 210 receives the HTML page and causes the movie player 212 to execute the embedded movie file. The movie player 212, not shown in FIG. 4, may be previously embedded within the web-browser 210 or downloaded by the web-browser 210.

The execution of the movie occurs generally in step 410. In general, the movie player 212 within the web browser 210 executes the movie code, which causes graphics (i.e. visual graphical objects and text) to be displayed on the user interface 213. This may include graphics that prompt the user for inputs. The movie code allows for the input of information by the user via the user interface 213. The inputs may include those necessary to perform authentication steps, such as a user name and password. Preparing Flash movies capable of receiving user inputs is well known in the art, such as is exemplified by the software appendix to this disclosure.

The movie also causes the web movie player 212 to exchange user input information with the update driver 204 to facilitate authentication. In an alternative, initial authentication may take place using web forms and http data, between the web browser 210 and the web server 206. In the embodiment described herein, such operations are carried out by the web movie within the web movie player 212.

The server side of the authentication operation, wherein a user name and password is compared to a stored list or table of authorized user names and passwords, is performed in this embodiment by the update driver 204. Moreover, the Flash movie may from time to time receive updated alarm (or condition) status from the update driver 204. The Flash movie performs an operation to update the displayed graphics/text based on the updated information. As discussed above, the use of the movie file format allows updates to be provided multiple times without renewed polling requests from the web browser 210. The movie program preferably also allows the user to request, via the user interface, detail regarding certain nodes by selecting a particular graphic. Once the user interface 213 receives such a request, it is communicated via the TCP/IP socket over the Internet 106 to the update driver 204. The flash movie can obtain a graphic file containing the requested file via the update driver 204 (or another program). The movie program in the Flash movie player 212 may then render the graphics and rearrange the other graphic elements to accommodate the new graphic file. Details regarding such graphics are known in the art, and the organization of the graphics on the screen will necessarily vary from implementation to implementation.

Figure 5A:
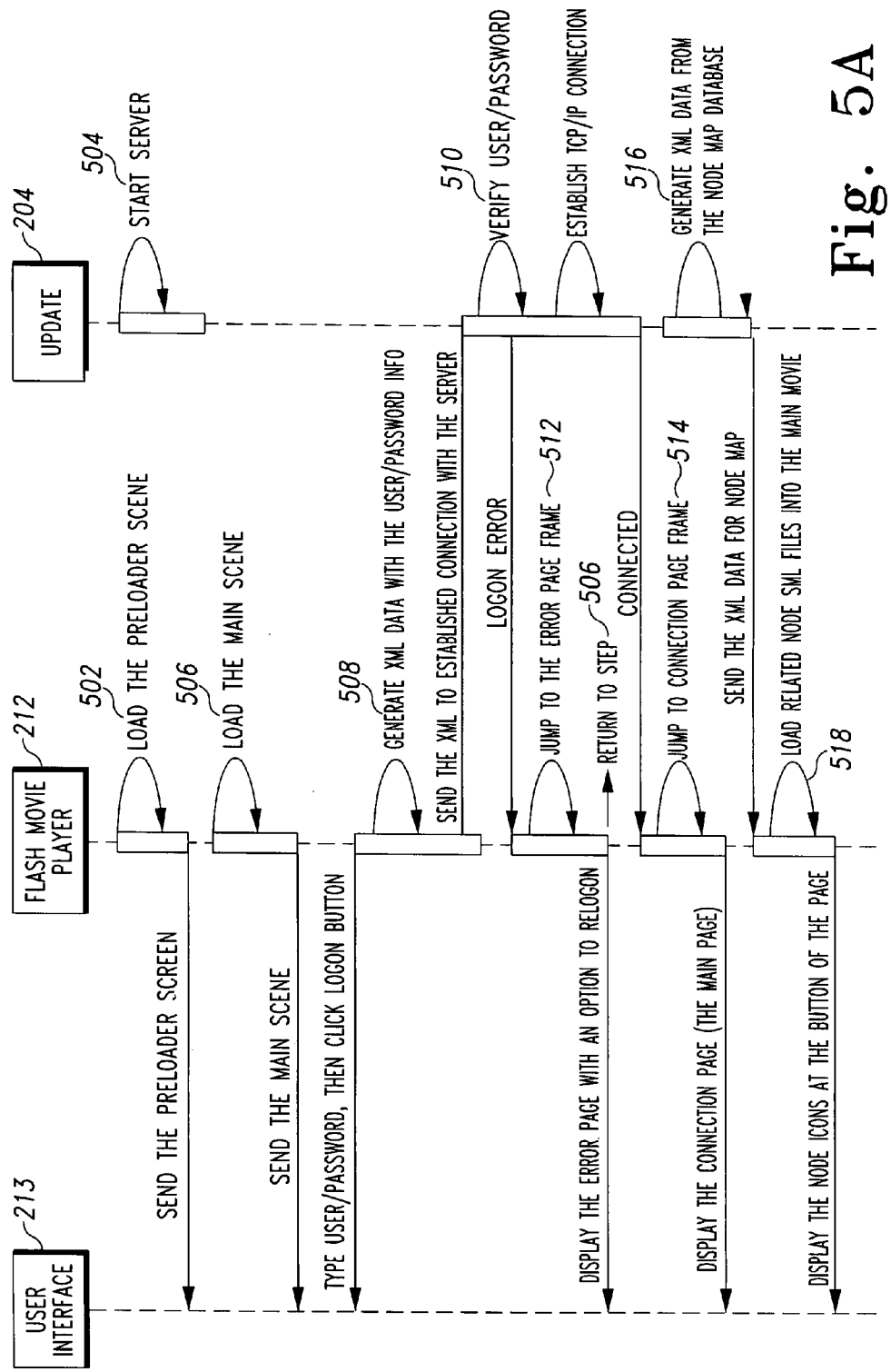
FIGS. 5a, 5b show in further detail a set of operations that may be performed in accordance with an embodiment of the embodiment.
Figure 5B:
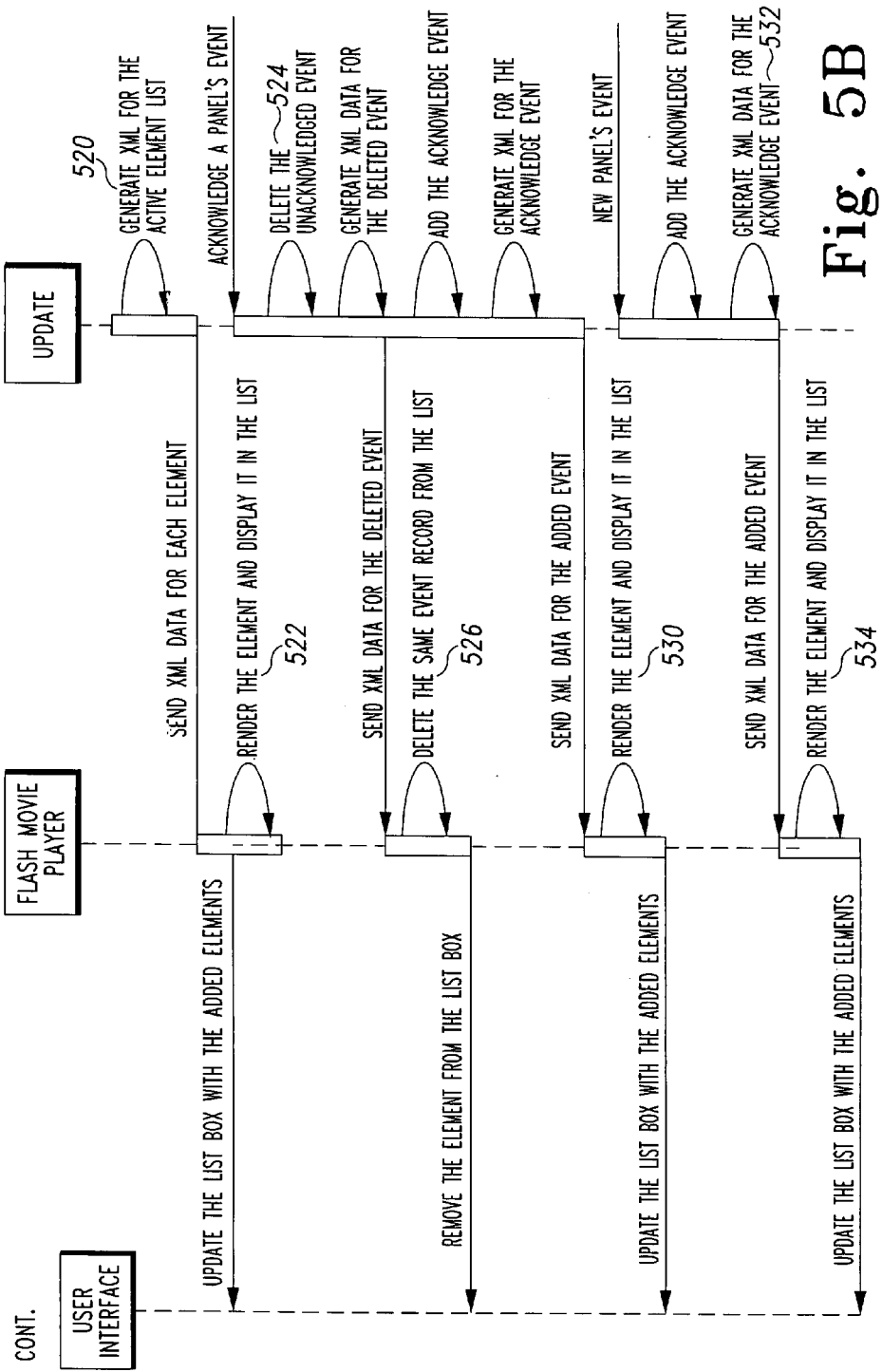

Further detail regarding the operations of step 410 of FIG. 4 are provided in FIGS. 5a and 5b, described below. In particular, FIGS. 5a and 5b show in further detail the operations of the web movie player 212 executing the web movie provided by the web server 206, as well as the operations of the update server 204 in providing information for use by the web movie player 212. These operations are part of the operations of the step 410 of FIG. 4 in further detail. As discussed above, in step 410, the web movie player 212 executes the movie that provides the remote alarm status display information to the user interface 213 of the remote computer 102.

The operations of FIGS. 5a and 5b are described in terms of the web movie executed on or through the web movie player 212 of the remote computer 102, and the update server 204 of the control station 112. In general, the update server 204 and the web movie on the web movie player 212 exchange information via a TCP/IP socket established between those two objects. The web movie player 212 also exchanges information with a user via the user interface 213. With reference to the software appendix, the Frame 1 code includes code that generates an XML socket (XMLSocket) as well as functions for parsing received XML data ("handleXML"). The XML socket, as will be discussed below, allows for XML data updates to be received by the web movie player 212 from the update server 204 without the need for polling from the client side.

The operations of the web movie player 212 comprise execution of the downloaded web movie code provided in step 406 of FIG. 4. The details of such software are omitted herein but would be readily apparent to those of ordinary skill in the art. The operations described below are suitably carried out in a Macromedia Flash environment using the ActionScript language. The attached software appendix includes salient portions of the web movie that carry out operations as will be described herein, in ActionScript source.

Referring now to FIG. 5, in step 502, the web movie player 212 begins a preloader "scene" of the movie code in which a non-informational graphic is provided while the main movie is downloading into the player 212. The web movie player 212 provides the preloader scene to the user interface 213. At about the same time, in step 504, the update driver 204 begins a server operation that maintains the transaction with the remote computer 102 at the control station 112. The subsequent steps of the update server 204 describe herein constitute the update driver or server operation. Those of ordinary skill in the art may readily generate a server operation or object that carries out the operations described herein.

In step 506, the web movie player 212 loads the main "scene" of the movie code, which basically starts a timeline of events or "frames", including execution of embedded movies in the order described below. The main scene is provided to the user interface 213. Among other things, the main scene at the user interface 213 prompts the user to provide a user name and password for authentication purposes.

In step 508, the web movie player 212 receives the user name and password information from the user interface and generates corresponding XML data structures containing such information. The generated XML structure is provided to the update server 204. In the software appendix, this operation is handled by the function "handleConnect", which uses the function "sendXML" to transmit the user identification and password to the update server 204.

In step 510, the update server 204 receives the user name and password information and determines whether the information matches required information to allow a session to continue. If so, the update server 204 sends information to the movie player 212 indicating the successful connection. Responsive to receiving the information indicating a successful connection, the movie player executes step 514 in which the movie player 212 jumps to a page frame associated with successful connection with the update server 204 and causes the user interface to display a page indicating the successful connection. The update server 204 thereafter proceeds to step 516, discussed further below.

If however, in step 510, the update server determines that the submitted user name and password does not match a valid account, then the update server 204 sends information to the movie player 212 indicating a login error. Responsive to receiving the information indicating the login error, the movie player executes step 512 in which the movie player 212 jumps to a page frame associated with a login error and causes the user interface to display a page indicating the login error. After step 512, the movie player 212 may either end the session or return to step 506. In any event, the update server 204 does not execute step 516.

The steps described hereafter all occur after a successful login. After step 514, the update server 204 in step 516 generates XML data that includes a node map of the system. The node map is a set of node data that describe each node of the fire safety system. In this embodiment, the nodes may be the fire control devices 220, 222 (See FIG. 2). In at least one embodiment the set of nodes includes primarily only the fire control panels, such as fire control panels 114 of FIG. 1, and the control stations, such as control stations 112, 113 of FIG. 1. The node map information provides, for each node, a node name, a node address (i.e. network address), the type of node (type of fire control panel or control station), current status, an alarm event count associated with the node, whether alarm events are acknowledged. The update server 204 obtains such information from the fire safety system database which is maintained by, or at least is accessible by, the control station element 202 of FIG. 2. Most sophisticated fire control systems include or maintain a similar collection of data regarding nodes or points. A node map may readily be generated from such data. The update server 204 provides the information in XML data format to the web movie player 212.

In step 518, the web movie player 212 receives the XML formatted node map information and parses the information using parsing rules contained with the downloaded web movie. For example, referring the software appendix, when the XML data is received by the web movie player 212, the web movie may suitably execute the function "handleXML" of the software appendix. The "handleXML" function parses the nodeName portion of the XML data to determine the type of XML data that is being received. Because the XML data contains the node map, the "nodeName" field of the data will identify it as a "node_map". As a result of the initial parsing that identifies the "node_map", the "handleXML" function executes the "parseNodeMap" function to parse the remaining XML data.

Referring again generally to step 518, the web movie player 212 creates an embedded movie corresponding to each node based on the node map information. The embedded movie is a node graphic that has an appearance that reflects an identifier of the node (i.e. either node name and/or address) and some status information regarding the node (whether any alarm events are unacknowledged, or whether alarms exist at all). The status information may be communicated by selecting certain colors and/or animation indicative of various status levels. For example, color may be used to indicate alarm event severity and flashing animation may be used to indicate a fire panel "heart beat". Such graphical indications of fire system conditions/operations are known in the art, at least in the context of local displays. It will be appreciated that such graphical indications can vary from system to system in accordance with user preferences.

Referring to the software appendix, the function "drawNodes" of the web movie causes the web movie player 212 to draw each node. In accordance with the embodiment described herein, each node graphic may be an embedded movie within the main web movie, as can be seen by the "loadMovie" function call within the "drawNodes" function.

A simplified example of an embedded node movie is provided as the "XLS embedded movie code".

By way of illustration, the alarm status display 600 of FIG. 6 shows four alarm graphics 602a, 602b, 602c, 602d that would be generated in step 518. Each graphic 602x is generated as a result of a separate embedded movie within the main movie. If a node 602a, 602b, 602c or 602d is working and responsive, that node graphic would animate as heart beats to show a live status. Otherwise, each node may suitably be represented as a non-animated graphic. If an audible alarm is sounding at one of the nodes, the embedded movie for that node may include a speaker graphic with an animated depiction of sound waves emanating from the speaker.

Referring to FIG. 5b, in step 520, the update server 204 generates XML data that includes an event list for the fire safety system. The event list represents a set of alarm events. Each alarm event is represented on the event list as an event list element. The event list is typically ordered by priority. As discussed further above, alarm events may indicate trouble such as smoke, or activation of a pull handle. Such events would be assigned a relatively high priority. Alarm events may also indicate equipment problems such as communication errors or device malfunctions, which may be lower priority.

The event list information provides, for each event list element, a text message providing information regarding the event, a date/time stamp of the event, the node name associated with the event, the node address associated with the event, the type of event (malfunction, communication, trouble), acknowledgement status, and an event number (indication of priority). The update server 204 obtains such information from the fire safety system database which is maintained by, or at least is accessible by, the control station element 202 of FIG. 2. Most sophisticated fire control systems include or maintain a similar collection of data regarding events of the fire safety system from which an event list similar to that described above may be generated. The update server 204 provides the information in XML data format to the web movie player 212.

In step 522, the web movie player 212 receives the XML formatted event list information and parses the information using parsing rules contained with the downloaded web movie. The web movie player 212 then creates an embedded movie clip corresponding to event list. The embedded movie clip generates on the user interface 213 an alarm event list that includes, for each event, text and graphics derived from information passed in the XML file.

Referring to the software appendix, the event list is populated by receiving "active elements" or event data for each active event on the list. Each newly received "active element" is inserted or added to the active element list maintained by the movie. In particular, the web movie player 212 receives the XML data and, as usual, executes the function "handleXML" of the software appendix. Because the XML data contains an element of the event list, the "nodeName" of within the data will identify it as an "ActiveElement". As a consequence, the "handleXML" function determines that the received XML data is an "ActiveElement", and as a result, executes the "parseActiveElement" function to parse the remaining XML data. In this function, the received "active element" or new event is inserted into the existing event list, using the function "insertIntoList". The event list may then be displayed in order. (See "Frame 65 code" and "Framer 66 code").

By way of illustration, the alarm status display 600 of FIG. 6 shows an event list 604 containing a plurality of listed alarm events 604a, 604b, and so forth, that are generated in step 522.

Each element of the list 604 contains information provided through the event list XML data.

Accordingly, the result of the execution of steps 516-522 is an alarm status display similar to the alarm status display 600 of FIG. 6. As described above the web movie player 212, executing the web movie downloaded in step 406 of FIG. 4, generates graphics having features or elements dictated by XML data received from the update server 204.

Once the alarm graphic display is completed after step 522, the web movie player 212 loops through the existing embedded movies awaiting either user input terminating the session (or requesting further detail regarding a node or alarm event). However, the web movie player 212 continues to be connected to receive further information from the update server 204 using the TCP/IP socket provided by the FLASH XML socket technology. The FLASH XML Socket technology allows a remote client to continue to receive XML data updates from an update driver without polling for such updates.

Absent such updates, the movie program, which acts as a client object, sits idle until it receives data from the update driver 204. "Sit idle" does not mean that the movie animation stops. The movie program continues running with no change in graphic clips.

From time to time, however, various changes may occur in the condition of the fire safety system such as a new event, or acknowledgement of an existing event. These changes occur in nearly all existing fire safety systems. If such a change occurs, the update server 204 is notified by the control system element 202. The update server 204 generates corresponding XML data and transmits the data to the web movie player 212. The web movie player 212 contains code that parses the XML data and effectuates changes to the alarm graphic display. Referring to the software appendix, an update may take the form of a "Command" to delete an event (See function "parseCommand") or to add a node event (See function "parseNodeEvent"). The "Frame 84 code" illustrates the updating of nodes that may be executed whenever node information is updated.

By way of example, steps 524-530 of FIG. 5 show operations performed by the update server 204 and movie player 212 to reflect a change of status for an alarm event from "unacknowledged" to "acknowledged". As discussed above, "acknowledgement" status of an alarm event is an important aspect of fire safety systems. As a result, when an operator acknowledges an event (such as through the control station 112), it is an important change of status that should be reflected in the alarm graphic display at the both the control station 112 and at the user computer 102.

When an alarm event is "acknowledged" in the fire safety system, the update server 204 obtains indication of the acknowledgement from the control station element 202 (see FIG. 2). In step 524, the update server 204 first generates XML data reflecting that the "unacknowledged" alarm event should be deleted. This XML data is provided to the web movie player 212. In step 526, the web movie player 212 receives the XML data and causes the unacknowledged alarm event to be deleted from the event list displayed on the user interface. Referring to the software appendix, this operation is carried out by the "parseCommand" function, which interprets a command from the update server 204 stating that a particular event from the event list should be deleted. Such deletion results in an update to the event list as well as in an update to the attributes of the node graphic.

In step 528, the update server 204 also generates XML data reflecting that a new "acknowledged" alarm event should be added to the event list. This XML data is also provided to the web movie player 212. In step 530, the web movie player 212 receives the XML data and causes the acknowledged alarm event to be added to the event list displayed on the user interface. Referring to the software appendix, this operation is carried out by the "parseNodeEvent" function, which interprets new node event data from the update server 204 stating that the event specified in the received data should be added to the event list. The "updateNode" function may also change the node graphic based on the new event.

As illustrated above, the acknowledgement of an alarm results in the update server 204 actually causing one event to be deleted from the list and new event to be added. The added event is identical to the deleted event, except that the acknowledgement status (and hence its priority) have changed. It is noted that in the alternative, the update server 204 could effectuate the change by merely changing the existing element of the event list from having an unacknowledged status to having an acknowledged status.

In the embodiment described herein, however, the change of "acknowledgement" status is carried out as a replacement alarm event because the event priority number also changes as a result of the acknowledgement, and will appear much lower in the alarm event list. As is known in the art, unacknowledged alarms have a much higher priority than acknowledged alarms of a similar severity. Thus, when an alarm event is acknowledged, not only does its status change, but also its priority. The change in priority and display on the alarm event list by the web movie player 212 is advantageously carried out be fully removing the unacknowledged event having a higher priority and adding a new acknowledged event having a lower priority.

Referring again generally to FIG. 5, the result of steps 524-530 is that the alarm event list (list 604 of FIG. 6) is updated when a change in the acknowledgement status of an event occurs. It is noted that after an update such as that illustrated by 524-530, the web movie player 212 continues to await further information for modification of the alarm graphic display, without polling the update server 204 for further updates. Subsequent updates thus occur without repetitive polling or renewed requests.

Steps 532 and 534 show another example that occurs when the update server 204 obtains information that a new alarm event has been generated. Steps 532 and 534 operate very much like steps 528 and 530, as both sets of steps effectively add an event to the event list. In step 532, the update server 204 generates XML data reflecting that the new alarm event should be added to the event list. This XML data is then provided to the web movie player 212. In step 530, the web movie player 212 receives the XML data and causes the new alarm event to be added to the event list displayed on the user interface 213. If the XML data identifies that the new alarm event has not been acknowledged, then the web movie player 212 causes appropriate corresponding icon to be displayed for that element of the alarm event list and to change the background color of the node graphic for the node associated with the new alarm event.

An event may also be removed from the list. Removal of an event typically occurs when an associated fire panel is reset. An indication of the reset and/or removal would be sent to the update server 204 the update server would operate in a manner analogous to that of steps 528 and 530 to remove an event from the event list. In particular, the update server 204 would generates XML data reflecting that the alarm event should be removed from the event list. This XML data is then provided to the web movie player 212. The web movie player 212 receives the XML data and causes the alarm event to be removed from the event list displayed on the user interface 213.

Thus, the above described embodiment uses web movie technology to provide a smooth alarm graphic display that may be updated using relatively simple XML files, and which does not require repetitive polling or update requests.

It will be appreciated that the above describe embodiments are merely exemplary, and that those of ordinary skill in the art may readily devise their own adaptations and implementations that incorporate the principles of the present invention and fall within the spirit and scope thereof.

For example, it will be appreciated that the appearance of the display 600 is largely a matter of preference, although there are advantages of the certain aspects of the layout of the display 600. In addition, the exact type of information included in the XML file for the node map and/or event list may vary depending upon user preference and the system in which the arrangement is employed. However, there are advantages to the selection of data provided herein.

We claim:

1. A method in a building control system, comprising:
    a) transmitting to a first computer at least one interpreted program over the Internet for receipt via a web-browser, the at least one interpreted program operative to, when executed at the first computer, display at least a first graphical element, each graphical element having characteristics dependent upon a status of a corresponding building control system device in a remote location;
    b) transmitting to the first computer first information regarding a change in status of at least one building control system device;
    c) at a time subsequent to step b), transmitting to the first computer second information regarding a subsequent change in status of at least one building control system device, said transmitting provided in the absence of a request transmitted by the first computer for updated information.

2. The method as claimed in claim 1, wherein step c) further comprises employing the first computer to open an XML socket to a source of the second information.

3. The method as claimed in claim 1, further comprising:
    d) receiving the first information at the first computer;
    e) causing a change in a display of a graphical element corresponding to the at least one building control system device to which the first information pertains.

4. The method as claimed in claim 3, further comprising:
    f) receiving the second information at the first computer;
    g) causing a change in a display of a graphical element corresponding to the at least one building control system device to which the second information pertains.

5. The method as claimed in claim 1, wherein the at least one interpreted program is further operative to, when executed by the first computer, display a plurality of graphical elements, each graphical element having characteristics dependent upon a status of a corresponding one of a plurality of building control system devices in a remote location.

6. The method as claimed in claim 1, wherein step b) further comprises transmitting to the first computer the first information as non-graphical information.

7. The method as claimed in claim 6, wherein step b) further comprises transmitting to the first computer the first information as XML-formatted data.

8. The method as claimed in claim 1, wherein the building control system device comprises a fire safety system device.

9. The method as claimed in claim 1, wherein the at least one interpreted software program includes web movie code.

10. The method as claimed in claim 5, wherein the at least one interpreted software program includes a main web movie and an embedded movie for each of the plurality of graphical elements.

11. A method in a building control system, comprising:
    a) receiving at a first computer at least one interpreted program over the Internet using a web-browser, the at least one interpreted program including a web movie formatted content;
    b) executing at the first computer the at least one interpreted program to display at least a first graphical element, each graphical element having characteristics dependent upon a status of a corresponding building control system device in a remote location;
    c) transmitting to the first computer first information regarding a change in status of at least one building control system device.

12. The method as claimed in claim 11, wherein step b) further comprises:
    executing at the first computer a web movie player program to display at least a first graphical element, each graphical element having characteristics dependent upon a status of a corresponding building control system device in a remote location, wherein the building control system is a security system, fire safety system, lighting system, or HVAC system, and wherein said transmitting is provided in the absence of a request transmitted by the first computer for updated information.

13. The method as claimed in claim 12, wherein the web movie player program comprises a public domain movie player program.

14. The method as claimed in claim 13, wherein the web movie player program comprises a Flash player.

15. The method as claimed in claim 12, wherein step c) further comprises transmitting to the first computer the first information as non-graphical information.

16. The method as claimed in claim 15, wherein step c) further comprises transmitting to the first computer the first information as XML-formatted data.

17. The method as claimed in claim 12, further comprising:
    d) receiving the first information at the first computer;
    e) causing a change in a display of a graphical element corresponding to the at least one building control system device to which the first information pertains.

18. The method as claimed in claim 17, wherein step e) further comprises:
    using the at least one program to render a movie player program scene based on the first information; and
    displaying the rendered movie player program scene.

19. The method as claimed in claim 18, wherein step c) further comprises transmitting to the first computer the first information as non-graphical information.

20. The method as claimed in claim 19, wherein step c) further comprises transmitting to the first computer the first information as XML-formatted data.

21. An arrangement in a building control system, comprising:
    a user interface device operable to provide information in human perceptible format; and
    a processing circuit having a web-browser executing at least one interpreted program received over the Internet to
        display at least a first graphical element, each graphical element having characteristics dependent upon a status of a corresponding building control system device in a remote location;

receive first information via a communication circuit regarding a change in status of at least one building control system device; and at a time subsequent to receiving the first information, receive second information via the communication circuit regarding a subsequent change in status of at least one building control system device, said second information received in the absence of a request transmitted by the computing arrangement for updated information.

22. The arrangement of claim 21, wherein the processing circuit executes the at least one interpreted program including a web movie player program to display at least the first graphical element, wherein the building control system is a security system, fire safety system, lighting system, or HVAC system.

23. The arrangement of claim 21, wherein
the processing circuit and web-browser further cooperate to receive the first information as XML-formatted data.

* * * * *